(No Model.)

J. E. JERROLD, Sr. & H. H. BARCLAY.
TUBE CUTTER.

No. 401,279. Patented Apr. 9, 1889.

WITNESSES.
W. S. Amstutz.
Geo. W. King.

John E. Jerrold, Sr. INVENTOR.
Henry H. Barclay

Liggett & Liggett
ATTORNEYS

UNITED STATES PATENT OFFICE.

JOHN E. JERROLD, SR., OF ERIE, PENNSYLVANIA, AND HARRY H. BARCLAY, OF CLEVELAND, OHIO.

TUBE-CUTTER.

SPECIFICATION forming part of Letters Patent No. 401,279, dated April 9, 1889.

Application filed November 5, 1888. Serial No. 289,995. (No model.)

*To all whom it may concern:*

Be it known that we, JOHN E. JERROLD, Sr., of Erie, in the county of Erie and State of Pennsylvania, and HARRY H. BARCLAY, of Cleveland, in the county of Cuyahoga and State of Ohio, have invented certain new and useful Improvements in Tube-Cutters; and we do hereby declare the following to be a full, clear, and exact description of the invention, such as will enable others skilled in the art to which it pertains to make and use the same.

Our invention relates to improvements in tube-cutters designed more especially for cutting boiler-tubes after the latter are in position in the boiler; and it consists in certain features of construction and in combination of parts hereinafter described, and pointed out in the claims.

Figure 1:
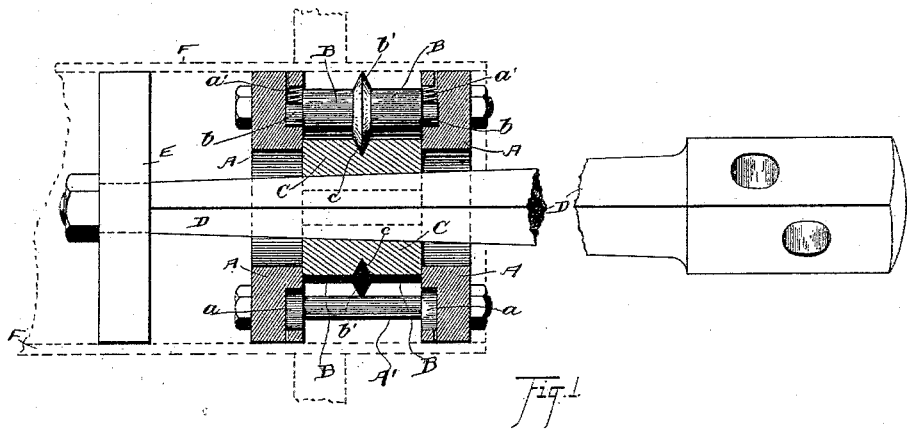
Figure 2:
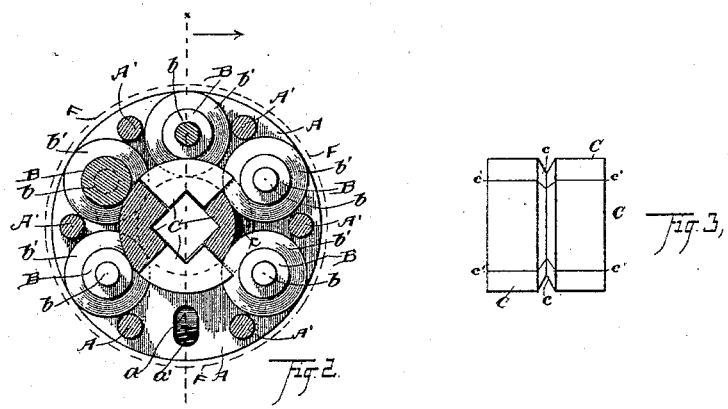
Figure 3:
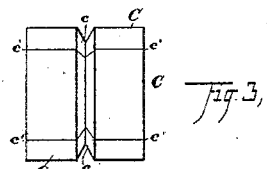
Figure 4:
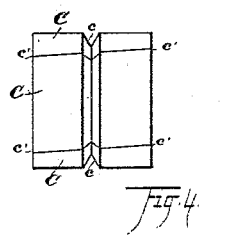
Figure 5:
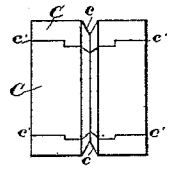

In the accompanying drawings, Figure 1 is a side elevation, partly in longitudinal section. Fig. 2 is an end elevation, partly in section. Figs. 3, 4, and 5 are plans of the driver detached, showing modifications in the division-lines thereof.

The tube-cutter consists, in the main, of flat rings A A, a series of cutter-tubes, B, usually six in number, cylindrical sectional driver C, and tapering mandrel D, the latter being square in cross-section, as shown. Rings A are rigidly connected by means of a series of studs, A', the opposing faces of these rings having a series of recesses, $a$, elongated radially and arranged in pairs, in which recesses operate the trunnions $b$ of the cutting-rollers, slight springs $a'$ being secured, respectively, in each recess outside the roller-trunnion to collapse the rollers. Rollers B have each a V-shaped rib, $b'$, that constitutes the cutter proper. The cutting-rollers by means of spring $a'$ are kept always in contact with the periphery of the driver C, the latter having a circumferential groove, $c$, for receiving the cutters $b'$. The driver is cylindrical externally, and internally has a square tapering socket adapted to receive and fit mandrel D. The driver is divided longitudinally into equal sections—usually four in number—as shown in Fig. 2. The division-line $c'$ $c'$ may be slightly oblique, as shown in Fig. 4, or may be on irregular lines, as shown in Fig. 5, in either case so as to bridge the cutter-rollers over the open joints caused by expanding the driver.

A disk, E, is secured to the small end of the mandrel. This disk, fitting easily inside the tube, serves as a guide to keep the cutters square with their work, so that the cutters will track with each other. The tube is shown at F.

In operating the device the cutters for new work are set to cut the tube just outside the tube-sheet; or for old work, where the tubes are to be removed, the device is placed with the cutters just inside the tube-sheet. By forcing the mandrel endwise into the driver the latter is expanded, and in turn forces the cutter against the inside of the tube, and by revolving the mandrel and driver the cutter-rollers, by friction on the driver and against the inside of the boiler-tube, are rotated, whereby the cutters travel in a path on the inner surface of the tube and sever the latter. From the fact that the cutter-rollers are expanded and rotated by contact with the driver the trunnions of these rollers have only to guide the latter, and consequently these trunnions are only subjected to nominal strain, friction, and wear.

Oblique or irregular division-lines of the driver are not considered essential. In fact, we are successfully operating tube-cutters where the division-lines are straight longitudinally, as shown in Fig. 3, and from the fact that there are six cutter-rollers and but four divisions of the driver it follows that but two cutter-rollers can cross these divisional joints at a time, leaving four cutter-rollers always in working position, while the other two rollers are momentarily slacked in crossing the joint.

What we claim is—

1. The combination of a pair of rings having recesses therein, cutter-rollers, the trunnions of which rest in said recesses, a sectional driver located between the rings and engaging the cutter-rollers and provided with an angular socket, and bolts connecting the rings and locking the parts in position, of a tapering mandrel having a cross-section corresponding in shape to the angular socket in the driver, substantially as set forth.

2. The combination, with a pair of rings having recesses therein, cutter-rollers, the trunnions of which rest in said recesses, springs located within the recesses outside of the roller-trunnions and bearing against said trunnions, a sectional driver located between the rings and engaging the cutter-rollers, and provided with an angular socket, and bolts connecting the rings and locking the parts in position, of a tapering mandrel having a cross-section corresponding in shape to the angular socket in the driver, substantially as set forth.

In testimony whereof we sign this specification, in the presence of two witnesses, this 29th day of August, 1888.

JOHN E. JERROLD, SR.
HARRY H. BARCLAY.

Witnesses:
CHAS. H. DORER,
ALBERT E. LYNCH.